United States Patent
Bergman et al.

(10) Patent No.: US 9,679,481 B2
(45) Date of Patent: Jun. 13, 2017

(54) SYSTEMS AND METHODS FOR VARIABLE DETECTION BASED ON TRAFFIC COUNTER INPUT

(71) Applicants: Adam S. Bergman, Boca Raton, FL (US); Manuel Soto, Lake Worth, FL (US)

(72) Inventors: Adam S. Bergman, Boca Raton, FL (US); Manuel Soto, Lake Worth, FL (US)

(73) Assignee: Tyco Fire & Security GmbH, Neuhausen Am Rheinfall (CH)

( * ) Notice: Subject to any disclaimer, the term of this patent is extended or adjusted under 35 U.S.C. 154(b) by 0 days.

(21) Appl. No.: 15/067,657

(22) Filed: Mar. 11, 2016

(65) Prior Publication Data

US 2017/0069202 A1  Mar. 9, 2017

Related U.S. Application Data

(60) Provisional application No. 62/215,274, filed on Sep. 8, 2015.

(51) Int. Cl.
| | |
|---|---|
| G08B 13/14 | (2006.01) |
| G08G 1/052 | (2006.01) |
| G08G 1/04 | (2006.01) |
| G08B 21/02 | (2006.01) |
| G06K 7/10 | (2006.01) |

(52) U.S. Cl.
CPC ......... *G08G 1/052* (2013.01); *G06K 7/10108* (2013.01); *G08B 21/02* (2013.01); *G08G 1/04* (2013.01)

(58) Field of Classification Search
CPC ...... G08G 1/052; G08G 1/04; G06K 7/10108; G08B 21/02; G08B 13/2468

USPC .................................. 340/572.1–572.9, 936
See application file for complete search history.

(56) References Cited

U.S. PATENT DOCUMENTS

| | | | | |
|---|---|---|---|---|
| 5,030,941 A | * | 7/1991 | Lizzi | G08B 13/2474 340/522 |
| 8,199,013 B2 | * | 6/2012 | Bergman | G07C 9/00 340/568.1 |
| 2005/0012613 A1 | * | 1/2005 | Eckstein | G06K 7/0008 340/539.13 |

(Continued)

FOREIGN PATENT DOCUMENTS

| | | |
|---|---|---|
| EP | 2779022 A1 | 9/2014 |
| WO | 2013/192033 A1 | 12/2013 |

OTHER PUBLICATIONS

PCT International Search Report and Written Opinion of the International Searching Authority (EPO) for International Application No. PCT/US2016/050799 (dated Dec. 20, 2016).

*Primary Examiner* — Anh V La
(74) *Attorney, Agent, or Firm* — Fox Rothschild LLP; Robert J. Sacco; Carol E. Thorstad-Forsyth

(57) ABSTRACT

In an Electronic Article Surveillance ("EAS") system a response is detected to an electromagnetic field. The response is caused by one or more objects present within the surveillance zone and an alarm condition is then selectively generated in accordance with one or more detection algorithms. A speed of a person traveling through the surveillance zone is measured, and if the speed exceeds a threshold then at least one characteristic of the detection algorithm(s) is varied to decrease a rigor of the detection algorithm.

21 Claims, 6 Drawing Sheets

(56) References Cited

U.S. PATENT DOCUMENTS

| | | | |
|---|---|---|---|
| 2009/0002172 A1* | 1/2009 | Hannah | A47F 10/04 340/572.1 |
| 2010/0171619 A1 | 7/2010 | Hall | |
| 2015/0194030 A1* | 7/2015 | Davidson | G06K 7/10356 340/572.7 |
| 2016/0196485 A1* | 7/2016 | Patterson | G06K 19/0723 340/572.1 |

* cited by examiner

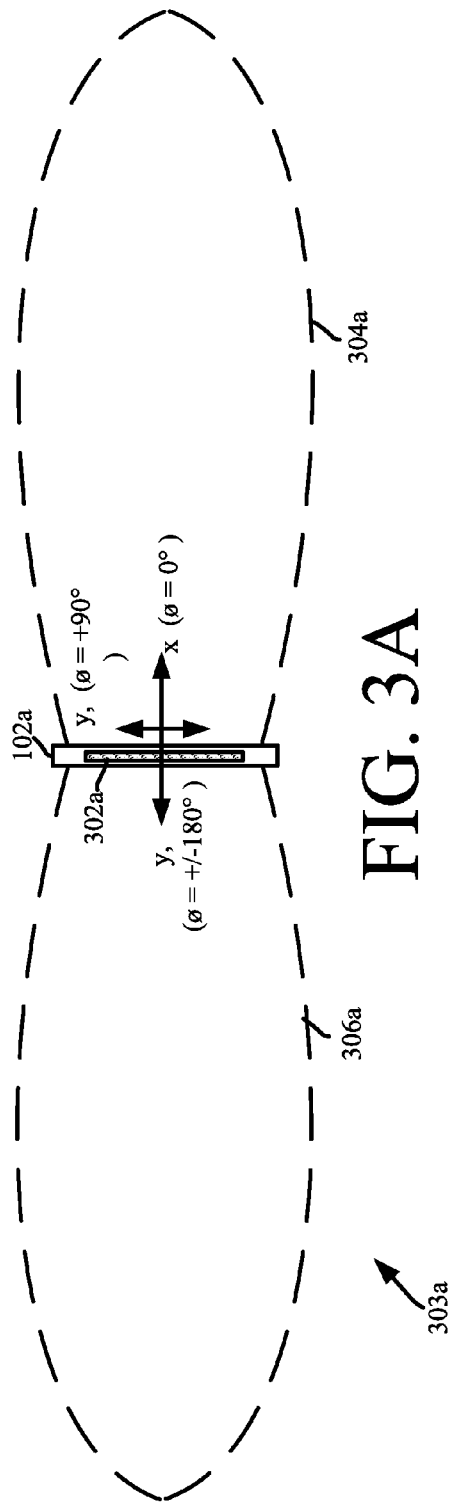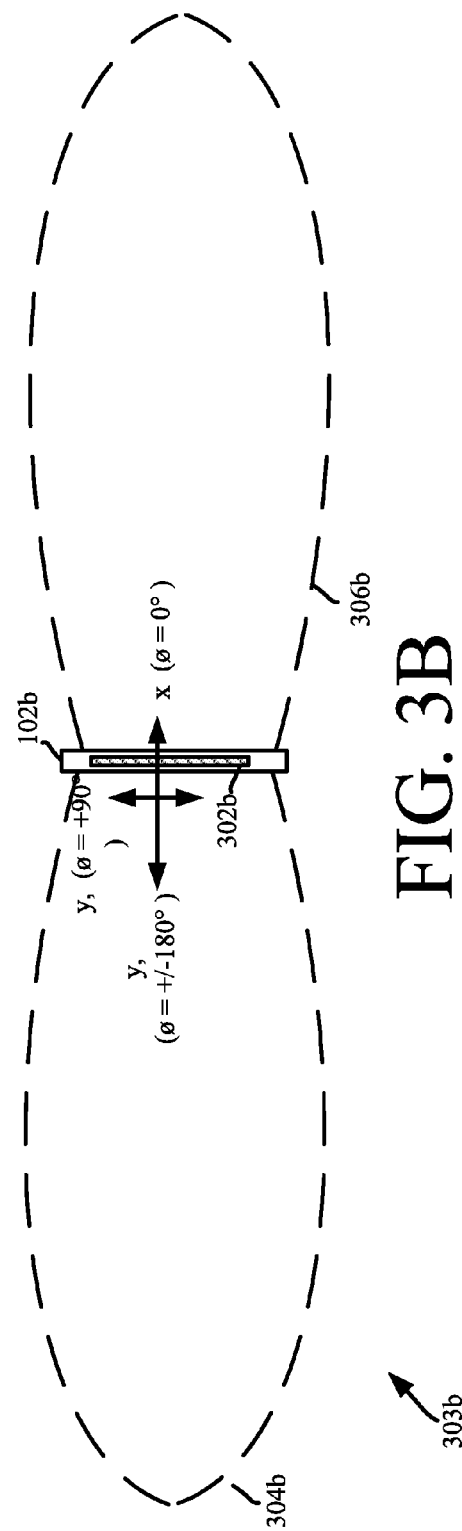

SYSTEMS AND METHODS FOR VARIABLE DETECTION BASED ON TRAFFIC COUNTER INPUT

CROSS-REFERENCE TO RELATED APPLICATIONS

This application claims the benefit of U.S. Provisional Application No. 62/215,274, filed on Sep. 8, 2015, which is hereby incorporated by reference in its entirety.

BACKGROUND OF THE INVENTION

Statement of the Technical Field

The invention relates generally to Electronic Article Surveillance ("EAS") systems, and more particularly to methods and systems for adjusting aspects of the detection process responsive to varying conditions.

Description of the Related Art

EAS systems generally comprise an interrogation antenna for transmitting an electromagnetic signal into an interrogation zone, markers which respond in some known electromagnetic manner to the interrogation signal, an antenna for detecting the response of the marker, a signal analyzer for evaluating the signals produced by the detection antenna, and an alarm which indicates the presence of a marker in the interrogation zone. The alarm can then be the basis for initiating one or more appropriate responses depending upon the nature of the facility. Typically, the interrogation zone is in the vicinity of an exit from a facility such as a retail store. The markers can be attached to articles such as items of merchandise or inventory.

One type of EAS system utilizes Acousto-Magnetic ("AM") markers. The general operation of an AM EAS system is described in U.S. Pat. Nos. 4,510,489 and 4,510,490, the disclosures of which are herein incorporated by reference. The detection of markers in an AM EAS system by pedestals placed at an exit is focused on detecting markers within the spacing of the pedestals. For example, a first pedestal will generally include a main antenna field directed toward a surveillance or detection zone located between the first pedestal and a second pedestal. When an exciter signal is applied at the first pedestal, it will generate an Electro-Magnetic ("EM") field of sufficient intensity so as to excite markers within the surveillance or detection zone. Similarly, the second pedestal will generally include an antenna having a main antenna field directed toward the surveillance or detection zone (and toward the first pedestal). An exciter signal applied at the second pedestal will also generate an EM field with sufficient intensity so as to excite markers within the surveillance or detection zone. When a marker tag is excited in the surveillance or detection zone, it will generate an EM signal which can usually be detected by receiving the signal at the antennas associated with the first and second pedestal.

SUMMARY OF INVENTION

The invention concerns a method for issuing an alarm in an Electronic Article Surveillance ("EAS") system. An exciter coil is used to generate an electromagnetic field within a surveillance zone through which one or more persons travel when exiting from a secured area. Thereafter, a response is detected to the electromagnetic field caused by one or more objects within the surveillance zone. Based on the response to the electromagnetic field, an alarm condition is generated in accordance with one or more detection algorithms. For example, the detection algorithms can include a first detection algorithm for detecting an EAS tag in the surveillance zone. Alternatively, or in addition, the one or more detection algorithms can include a second detection algorithm for detecting a presence of a metal foil within the surveillance zone. The method further involves measuring a speed of a person traveling through the surveillance zone and determining if the speed exceeds a threshold. At least one characteristic of the detection algorithm(s) is/are varied when the speed indicated exceeds a predetermined threshold.

The characteristic of the detection algorithm is varied to decrease a rigor of the at least one detection algorithm when the speed exceeds the threshold. More particularly, the characteristic is varied to increase a likelihood of producing an alarm condition responsive to application of the at least one detection algorithm. The extent to which the characteristic is varied to decrease the rigor of the detection algorithm can be selectively varied in accordance with a plurality of different predefined speed ranges.

The invention also concerns an Electronic Article Surveillance ("EAS") system which implements the method described herein. Such a system can include an EAS transmitter coupled to an exciter antenna and arranged to generate an electromagnetic field within a surveillance zone through which one or more persons travel when exiting from a secured area. A receiving antenna is arranged to detect a response to the electromagnetic field caused by one or more objects within the surveillance zone. In some scenarios, the transmitting antenna can be the same as the receiving antenna. A system controller is communicatively coupled to the receiving antenna. The system controller evaluates the response to the electromagnetic field, and selectively produces an alarm signal in accordance with at least one detection algorithm which facilitate detection of the one or more objects present within the surveillance zone.

A speed detector is communicatively coupled to the system controller, and measures a speed of a person traveling through the surveillance zone. The speed detector can be implemented using an existing traffic counter. The system controller is configured to selectively vary at least one characteristic of the detection algorithm when the speed indicated by the speed detector exceeds a predetermined threshold. The detection algorithm can be configured to detect a presence of an EAS marker tag within the surveillance zone and/or to detect a presence of a metal foil within the surveillance zone. The system controller varies the characteristic as described above to selectively decrease a rigor of the at least one detection algorithm when the speed exceeds the threshold.

BRIEF DESCRIPTION OF THE DRAWINGS

Embodiments will be described with reference to the following drawing figures, in which like numerals represent like items throughout the figures, and in which:

FIGS. 3A and 3B are drawings which are useful for understanding a main field and a backfield of antennas which are used in an EAS system.

DETAILED DESCRIPTION OF THE INVENTION

Figure 1:
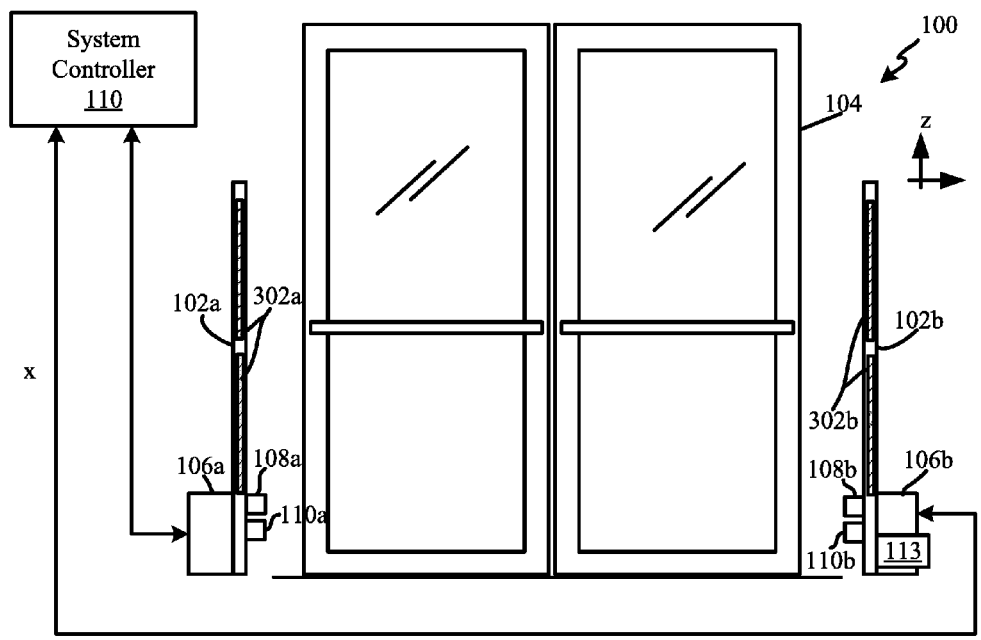
FIG. 1 is a side view of an EAS detection system, which is useful for understanding the invention.

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

In conventional EAS detection systems, the time duration required to detect an AM marker is fixed based on a specific detection algorithm. There are two types of detection algorithms, namely a frame detection algorithm and a sequential detection algorithm. The frame detection algorithm collects AM marker information a plurality of times during a frame prior to processing the same to determine it is valid. In contrast, in a sequential detection algorithm, collected AM marker information is processed sequentially after each timeslot of the frame. The particulars of these two detection algorithms will become more evident as the discussion progresses.

The frame detection algorithm uses timeslots or widows to determine that there is a valid AM marker in a surveillance or detection zone. During each timeslot or window, an EAS detection system transmits an interrogation signal into the surveillance or detection zone. An active AM marker (located in the surveillance or detection zone) transmits a response signal responsive to the interrogation signal. Each response signal includes a unique identifier of the AM marker. N iterations of this unique identifier collection process are performed. Upon completing the N iterations, the collected information is processed to determine if certain criteria is (are) met. The criteria can include(s), but is not limited to, a signal frequency, a signal phase, a signal amplitude and/or a unique identifier. For example, the unique identifier associated with each timeslot or window is compared to a plurality of known unique identifiers. If all N collected unique identifiers match the same pre-stored unique identifier, then a determination may be made that there is a valid AM marker in a surveillance or detection zone.

The sequential detection algorithm also uses timeslots or widows to determine that there is a valid AM marker in a surveillance or detection zone. During each timeslot or window, an EAS detection system transmits an interrogation signal into the surveillance or detection zone. An active AM marker (located in the surveillance or detection zone) transmits a response signal responsive to the interrogation signal. Each response signal includes a unique identifier of the AM marker. At this time, a determination is made as to whether certain criteria is (are) met. The criteria include(s), but is (are) not limited to, a signal frequency, a signal phase, a signal amplitude and/or a unique identifier. For example, the unique identifier is compared to a plurality of known unique identifiers. If a match is found, then a determination may be made that the AM marker is a valid AM marker during the given timeslot or window. This process is repeated N times, where N is an integer equal to the number of timeslots or windows employed by the algorithm. A final determination is made that a valid AM marker is present within the surveillance or detection zone when a valid AM marker is detected in all N timeslots or windows.

Notably, the validation process becomes more accurate as more timeslots or windows are used. Also, a number of false alarms generated by the EAS system will decrease as the accuracy increases. However, as more timeslots or windows are used to facilitate detection, the time duration of the detection process naturally increases. Therefore, a system designer must select the number of timeslots or windows used for the detection in an EAS system while giving due consideration to the false alarm and timing trade-offs. In some scenarios, the number of timeslots or windows is selected to be seven or nine for optimizing false alarms and accuracy.

A detection issue arises when shoplifters grab merchandise and run through the surveillance or detection zone of an EAS system. If the shoplifter passes through the surveillance or detection zone at a relatively high speed, then the AM marker may not be detected by the EAS system. This condition occurs when the person carrying the AM marker passes through the surveillance zone in less time than is needed to make a final determination as to whether or not there is a valid AM marker in the surveillance or detection zone. In such a scenario, the person does not spend enough time between the pedestals in order for the algorithm in use to fully execute by completing N iterations of a timeslot or window analysis. A novel solution to this problem is discussed below.

According to one aspect, a novel solution comprises a variable EAS detection algorithm that is based on the speed of people passing through the surveillance zone. The advantage of the novel solution is that the detection criteria is changed based on the detected speed of persons passing through the detection zone. According to one aspect, the rate of travel of persons passing through the detection zone is determined by a device which is sometimes referred to as a traffic counter. The traffic counter measures the number and direction of people traversing the surveillance or detection zone. A traffic counter as described herein can be disposed on or adjacent to the EAS pedestals defining the surveillance or detection zone. In some scenarios, the traffic counter comprises a dual through beam Infrared ("IR") configuration, Ultrasonic or other method for detecting people traversing the surveillance or detection zone. The exact arrangement or configuration of the traffic counter is not critical provided that it is capable of measuring speed and directionality of persons traversing through the surveillance or detection zone.

In a traffic counter having a conventional dual through beam IR configuration, a transmitter unit transmits two (2)

infrared beams from a first pedestal to a receiver unit on the second pedestal. Accordingly, a first and second infrared beam traverses the surveillance or detection zone. When someone passes between the transmitter and receiver unit and breaks the infrared beams, the count value is increased by one. The sequence in which the first and second infrared beams are broken determines the direction of travel. In a conventional traffic counter installation in a retail environment, there is usually no reason to collect information concerning the relative speed of persons passing through the portal. However, for purposes of the inventive arrangements described herein, the rate of travel of a person through the surveillance or detection zone can be determined using the existing traffic counter hardware configuration.

More particularly, the time duration between when a person breaks a first infrared beam and then breaks the second infrared beam of the traffic counter, can be used to derive the rate of travel of the person through the EAS surveillance or detection zone. A conclusion can be made that someone passing through the surveillance zone at a relatively fast pace is of more concern for shoplifting than someone passing through the surveillance or detection zone at a relatively slow pace (e.g., a normal walking pace). Using this conclusion, the rigor of the algorithm in the detection process applied for detecting the presence of EAS tags can be adjusted to correspond to the threat level implied by the rate of travel. In an exemplary embodiment, the rigor of the algorithm for detecting EAS tags is advantageously reduced so that an alarm is issued after a shorter processing duration under conditions where a faster rate of travel is detected for a person passing through the EAS surveillance or detection zone.

According to a second aspect, the inventive arrangements can alternatively or additionally involve a variable detection algorithm applied to detection of metal foil in the surveillance or detection zone. It is well known that persons seeking to thwart the operation of an EAS system can make use of a metal foil lined bag, which is sometimes referred to as a booster bag. The metal foil enclosure defined by the bag shields the EAS marker tags from responding to the electromagnetic fields that are present in the EAS surveillance or detection zone. In order to defend against such measures, conventional EAS systems have been adapted to utilize the existing transmitter, receiver and antenna hardware to also detect the presence of metal foil in the surveillance or detection zone. Accordingly, a variable EAS detection algorithm based on the speed of people passing through the surveillance zone can also be applied with respect to foil detection algorithms that are applied in the EAS system According to a further aspect, an alarm can be generated exclusively upon an indication from the traffic counter that the person is passing through the surveillance or detection zone at a relatively fast pace. The alarm could also be designed to indicate the speed of the person and/or whether the person is carrying an item having an active AM marker attached thereto. For example, the alarm could include an auditory periodic beep which signifies information concerning the basis for the alarm. In such a scenario, the duration between beeps could be caused to decrease as speed of the person increases. The tone of the beep in such a scenario could be used to indicate whether the person is carrying an item having an active AM marker attached thereto. The present invention is not limited to the particulars of this example. Thus, in some scenarios, the alarm additionally or alternatively includes a visual alarm such as emitted light. The color of the light may indicate speed and/or whether the person is carrying an item having an active AM marker attached thereto.

The implementation of the inventive system disclosed herein can be advantageously arranged so that it does not add new hardware and/or additional cost to the existing EAS systems. Since the solution can be software-implemented, it can also be readily ported to older systems to enhance their performance accordingly. The invention is described herein in terms of an AM EAS system, however the method of the invention can also be used in other types of EAS systems, including systems that use RF type tags and Radio Frequency Identification ("RFID") EAS systems. For purposes of the invention, such RF type tags would also be considered EAS marker tags. In fact, the inventive arrangements described herein can be applied to any type of EAS marker tag now known or known in the future.

Figure 2:
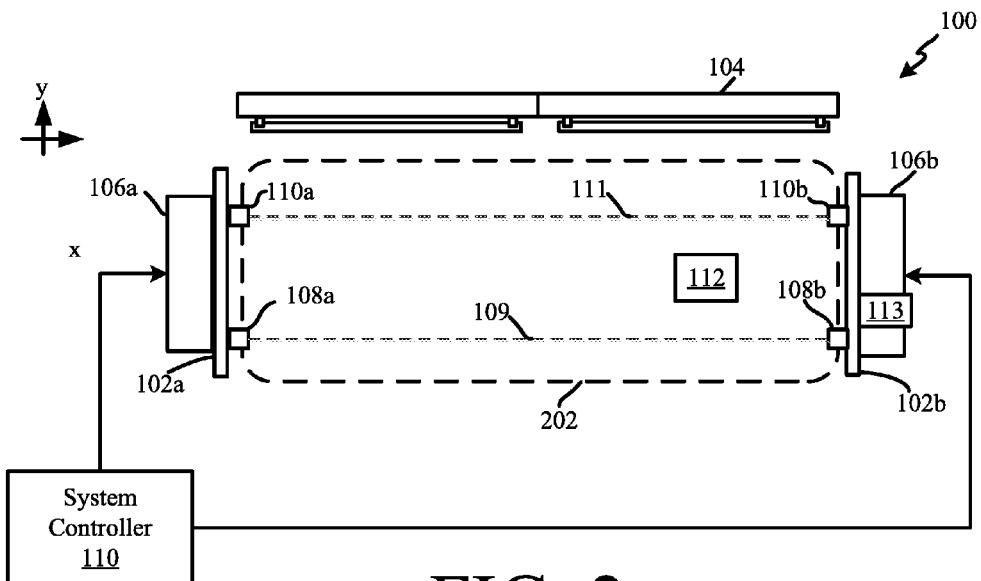
FIG. 2 is a top view of the EAS detection system in FIG. 1, which is useful for understanding an EAS detection zone.

Referring now to FIGS. 1-2, there are provided illustrations of an exemplary EAS detection system 100. The EAS detection system will be positioned at a location adjacent to an entry/exit 104 of a secured facility. The EAS system 100 uses specially designed EAS marker tags ("tags") which are applied to store merchandise or other items which are stored within a secured facility. The tags can be deactivated or removed by authorized personnel at the secure facility. For example, in a retail environment, the tags could be removed by store employees. When an active tag 112 is detected by the EAS detection system 100 in an idealized representation of an EAS surveillance or detection zone 202 near the entry/exit, the EAS detection system will detect the presence of such tag and will sound an alarm or generate some other suitable EAS response. Accordingly, the EAS detection system 100 is arranged for detecting and preventing the unauthorized removal of articles or products from controlled areas.

A number of different types of EAS detection schemes are well known in the art. For example, known types of EAS detection schemes can include magnetic systems, AM systems, radio-frequency type systems and microwave systems. For purposes of describing the inventive arrangements in FIGS. 1-2, it shall be assumed that the EAS detection system 100 is an AM type system. Still, it should be understood that the invention is not limited in this regard, and other types of EAS detection methods can also be used with the present invention.

The EAS detection system 100 includes a pair of pedestals 102a, 102b, which are located a known distance apart (e.g. at opposing sides of entry/exit 104). Notably, the invention is not limited to two pedestals architectures. For example, the EAS detection system could alternatively comprise one, three or four pedestal configurations. The pedestals 102a, 102b are typically stabilized and supported by a base 106a, 106b. Pedestals 102a, 102b will each generally include one or more antennas that are suitable for aiding in the detection of the special EAS tags as described herein. For example, pedestal 102a can include at least one antenna 302a suitable for transmitting or producing an electromagnetic exciter signal field and receiving response signals generated by marker tags in the surveillance or detection zone 202. Similarly, pedestal 102b can include at least one antenna 302b suitable for transmitting or producing an electromagnetic exciter signal field and receiving response signals generated by marker tags in the surveillance or detection zone 202. The antennas provided in pedestals 102a, 102b can be conventional conductive wire coil or loop designs as are commonly used in AM type EAS pedestals. These antennas will sometimes be referred to herein as exciter coils.

In some scenarios, a single antenna can be used in each pedestal. The single antenna is selectively coupled to the EAS receiver and the EAS transmitter in a time multiplexed manner. However, it can be advantageous to include two antennas (or exciter coils) in each pedestal as shown in FIG. 1, with an upper antenna positioned above a lower antenna as shown.

The antennas located in the pedestals 102a, 102b are electrically coupled to a system controller 110, which controls the operation of the EAS detection system to perform EAS functions as described herein. The system controller can be located within a base of one of the pedestals or can be located within a separate chassis at a location nearby to the pedestals. For example, the system controller 110 can be located in a ceiling just above or adjacent to the pedestals.

EAS detection systems are well known in the art, and therefore will not be described here in detail. However, those skilled in the art will appreciate that an antenna of an AM type EAS detection system is used to generate an EM field which serves as a marker tag exciter signal. The marker tag exciter signal causes a mechanical oscillation of a strip (e.g., a strip formed of a magnetostrictive or ferromagnetic amorphous metal) contained in a marker tag within a surveillance or detection zone 202. As a result of the stimulus signal, the tag will resonate and mechanically vibrate due to the effects of magnetostriction. This vibration will continue for a brief time after the stimulus signal is terminated. The vibration of the strip causes variations in its magnetic field, which can induce an AC signal in the receiver antenna. This induced signal is used to indicate a presence of the strip within the surveillance or detection zone 202. As noted above, the same antenna contained in a pedestal 102a, 102b can serve as both the transmit antenna and the receive antenna. Accordingly, the antennas in each of pedestals 102a, 102b can be used in several different modes to detect a marker tag exciter signal. These modes will be described below in further detail. Suitable signal processing circuitry and/or software (not shown in FIGS. 1 and 2) is provided in the system controller 110 to execute detection algorithms. These detection algorithms are applied to determine when an EAS active tag 112 is present in the surveillance or detection zone 202.

Similarly, the system controller 110 can include suitable signal processing circuitry and/or detection algorithms to facilitate detection of metal foil in the surveillance or detection zone. The algorithms used for detecting metal foil are different from the algorithms used to detect EAS tags. EAS systems which detect metal foil commonly do so by using the antenna at a second EAS pedestal 102b to measure perturbations in the electromagnetic field generated by the first EAS pedestal 102a. Unlike, the process used for EAS marker detection, the perturbation to the electromagnetic field caused by the presence of metal foil will generally be concurrent with the excitation of the field by the exciter coils. Metal foil detection systems incorporated into EAS pedestals are well known in the art and therefore will not be described here in detail.

A traffic counter system is provided to monitor people who are traversing through the surveillance or detection zone. Such systems are conventionally designed to monitor both inbound and outbound traffic, but for purposes of the present invention the outbound traffic exiting out of a secured area is of primary interest. The traffic counter system can be disposed in, on or adjacent to the pedestals 102a, 102b. The traffic counter is generally configured to measure the number and direction of people traversing the surveillance or detection zone 202. In some scenarios, the traffic counter comprises a dual through beam infrared (IR) configuration, ultrasonic or other method for detecting people traversing the surveillance zone. In the example shown in FIGS. 1 and 2, a dual through beam IR configuration is show. As illustrated therein, the dual through beam IR configuration comprises two pairs of beam formers 108a/108b, 110a/110b on the pedestals 102a, 102b. The beam formers can communicate with a traffic counter control unit 113 which performs the traffic counter functions described herein. Alternatively, one or more aspects of the traffic counter control unit 113 can be integrated into the system controller 110.

The two pairs of beam formers form two IR beams 109, 111 which extend across the surveillance zone 202. The spacing between the two IR beams 109, 111 is designed to facilitate determination of the direction of travel of persons transiting through the surveillance or detection zone 202. More particularly, the order in which the IR beams are broken by a person allows direction of travel to be inferred. But according to one aspect of the invention described herein, the spacing between the two beams can also be used to facilitate determination of the speed of a person passing through the surveillance zone. The speed of a person can be estimated by measuring the duration of time which passes between the moment when the first beam is broken and the moment when second beam is broken. The traffic information concerning the speed and direction of each person as measured by the traffic counter is advantageously communicated to the system controller 110. The information provided to the system controller 110 is then used to facilitate selective modification of certain EAS algorithms as hereinafter described.

The EAS detection system 100 implements at least one variable algorithm to modify a detection criteria associated with the EAS detection system. The detection criteria which are modified can involve detection criteria which are applied to the detection of EAS tags, the detection of metal foil, or both types of detection. The at least one algorithm is varied based on the speed of people passing through the surveillance or detection zone 202. The advantage of the novel solution described herein is that the detection criteria changes are based on the speed of persons passing through the surveillance zone, as detected by the traffic counter. An inference can be made that a person passing through the surveillance or detection zone 202 at a relatively fast pace is of more concern with regard to potential shoplifting than a person passing through the surveillance or detection zone at a relatively slow pace (e.g., a normal walking pace). This inference can be utilized by the system controller 110 to selectively reduce the rigor of an EAS detection algorithm applied in a detection process. According to a further aspect, an alarm can be generated when it is detected that a person is passing through the surveillance zone at a relatively fast pace. The alarm could be designed to indicate the speed of the person and/or whether the person was carrying an item having an active AM marker attached thereto.

Referring now to FIGS. 3A and 3B, there are shown exemplary antenna field patterns 303a, 303b for antennas 302a, 302b contained in pedestal 102a, 102b. As is known in the art, an antenna radiation pattern is a graphical representation of the radiating (or receiving) properties for a given antenna as a function of space. The properties of an antenna are the same in transmit and receive mode of operation and so the antenna radiation pattern shown is applicable for both transmit and receive operations as described herein. The exemplary antenna field patterns 303a, 303b shown in FIGS. 3A-3B are azimuth plane pattern representing the antenna pattern in the x, y coordinate plane. The azimuth pattern is represented in polar coordinate form and is sufficient for understanding the inventive arrangements. The azimuth antenna field patterns shown in FIGS. 3A-3B are a useful way of visualizing the pattern in which the antennas 302a, 302b will transmit and receive signals at a particular power level.

The antenna field pattern 303a, 303b shown in FIG. 3A includes a main lobe 304a with a peak at ø=0° and a backfield lobe 306a with a peak at angle ø=180°. Conversely, the antenna field pattern 303b shown in FIG. 3B includes a main lobe 304b with its peak at ø=180° and a backfield lobe 306b with a peak at angle ø=0°. For purposes of the invention described herein, we are primarily interested in the main lobes 304a, 304b. In an EAS system, each pedestal is positioned so that the main lobe of an antenna contained therein is directed into a surveillance or detection zone (e.g., surveillance or detection zone 202). Accordingly, a pair of pedestals 102a, 102b in an EAS system 400 shown in FIG. 4A will produce overlap in the antenna field patterns 303a, 303b as shown. Notably, the antenna field patterns 303a, 303b shown in FIG. 3A are scaled for purposes of understanding the invention. In particular, the patterns show the outer boundary or limits of an area in which an exciter signal of particular amplitude applied to antennas 302a, 302b will produce a detectable response in an EAS marker tag. A marker tag within the bounds of at least one antenna field pattern 303a, 303b will generate a detectable response when stimulated by an exciter signal.

Figure 4A:
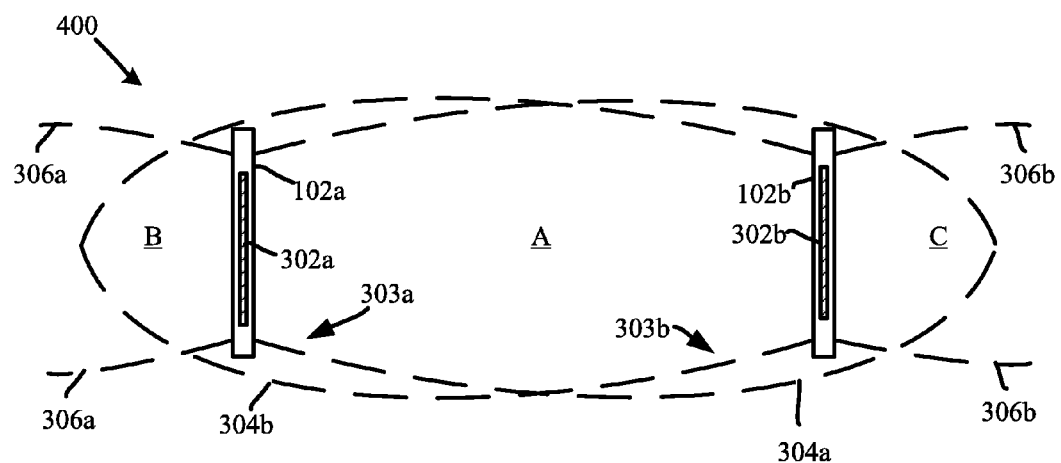
FIG. 4A is a drawing which is useful for understanding a detection zone in a non-idealized EAS detection system.
Figure 4B:
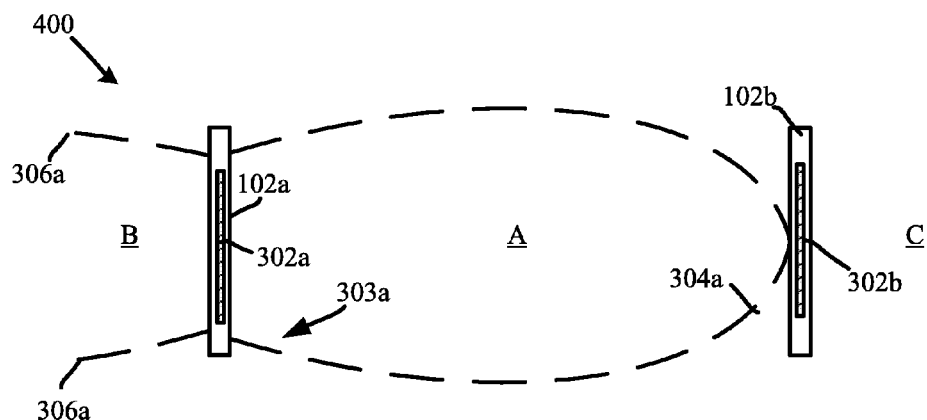
FIG. 4B is a drawing which is useful for understanding a detection zone in an EAS system where an exciter drive signal has been reduced in one of two pedestals.

The overlapping antenna field patterns 303a, 303b in FIG. 4A will include an area A where there is overlap of main lobes 304a, 304b. However, it can be observed in FIG. 4A that there can also be some overlap of a main lobe of each pedestal with a backfield lobe associated with the other pedestal. For example, it can be observed that the main lobe 304b overlaps with the backfield lobe 306a within an area B. Similarly, the main lobe 304a overlaps with the backfield lobe 306b in an area C. For purposes of the present invention, we are primarily concerned with area A. More particularly, Area A between pedestals 102a, 102b defines a surveillance or detection zone in which active marker tags should cause an EAS system 400 to generate an alarm response. Marker tags in area A are stimulated by energy associated with an exciter signal within the main lobes 304a, 304b and will produce a response which can be detected at each antenna. For example, as shown in FIG. 4B, one or more marker tags in area A can be excited by an exciter signal produced by antenna 102a in an area defined by main lobe 304a. The response of a marker tag can then be detected by antenna 102a and/or 102b and processed in a system controller 110.

Similarly, metal foil that is present in area A will cause a perturbation in an electro-magnetic field produced by antenna 302a in a main lobe 304a. This perturbation can be detected within a main lobe 304b of antenna 302b. Thereafter, the system controller 110 can apply a suitable metal foil detection algorithm to determine when such perturbation has occurred as a result of metal foil present in area A.

Figure 5:
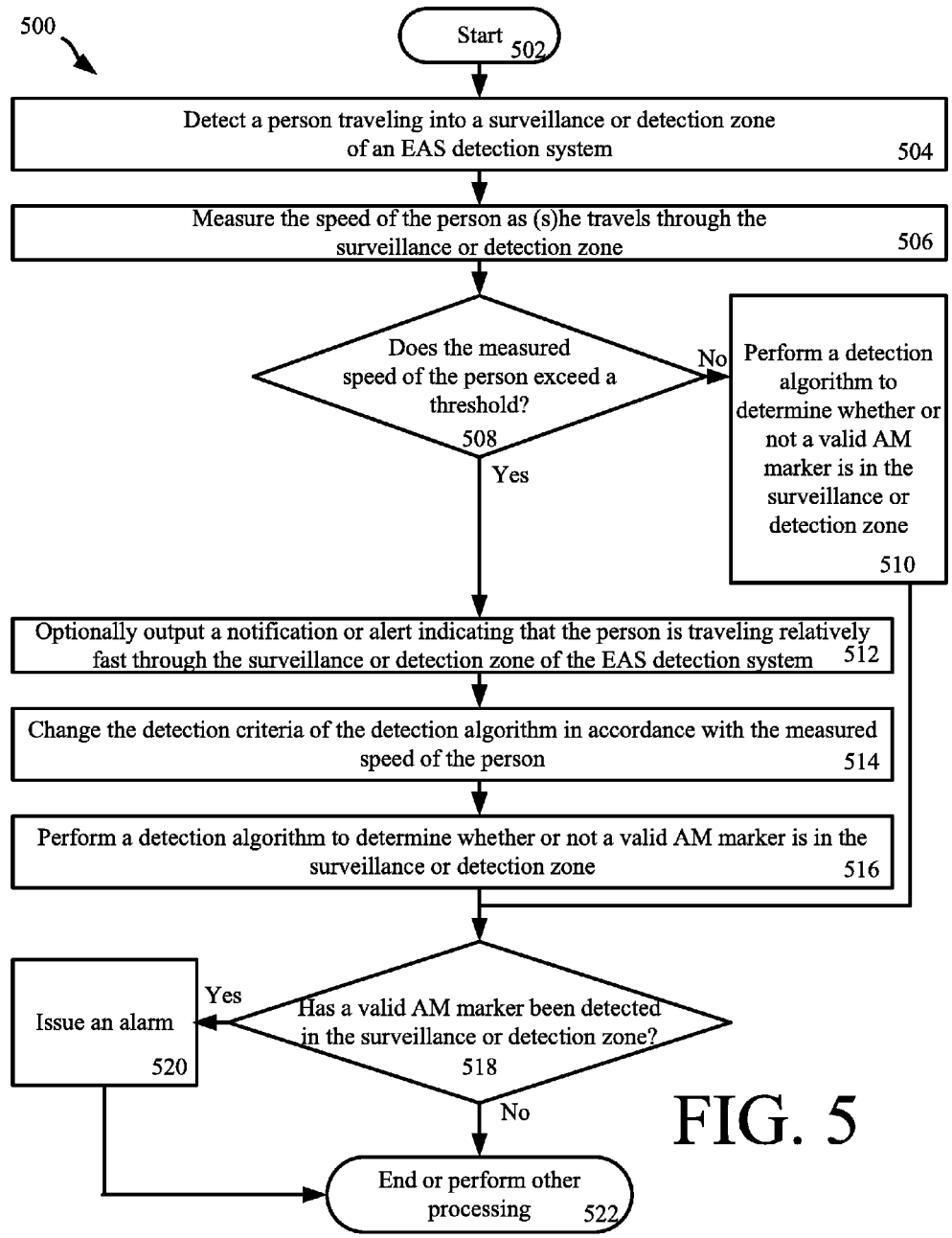
FIG. 5 is a flowchart that is useful for understanding an exemplary method for issuing an alarm responsive to the presence of an EAS tag in an EAS detection system.

Referring now to FIG. 5, there is provided a flowchart illustrating an exemplary method 500 for issuing an alarm in an EAS detection system (e.g., EAS detection system 100 of FIG. 1). Method 500 begins with step 502 and continues with step 504 where a detection is made that a person is traveling into a surveillance or detection zone (e.g., surveillance or detection zone 202 of FIG. 2) of an EAS detection system (e.g., EAS detection system 100 of FIG. 1). Next in step 506, the speed of the person is measured as (s)he travels through the surveillance or detection zone. If the measured speed of the person does not exceed a threshold [508:NO], then step 510 is performed where a detection algorithm is executed to determine whether or not a valid AM marker is in the surveillance or detection zone. If a valid AM marker has been detected in the surveillance or detection zone [518:YES], then an alarm is issued as shown by step 520. In contrast, if a valid AM marker has not been detected in the surveillance or detection zone [518:NO], then the alarm is not issued. Thereafter, step 522 is performed where method 500 ends or other processing is performed (e.g., return to step 504).

If the measured speed of the person exceeds the threshold [508:YES], then optional step 512 is performed. In optional step 512, a notification or alert is output indicating that the person is traveling relatively fast through the surveillance or detection zone of the EAS detection system. In next step 514, detection criteria of the detection algorithm is changed in accordance with the measured speed of the person. The detection criteria can include, but is not limited to, (a) the number of valid marker detections out of N marker detections (e.g., 7 out of 7 is changed to 3 output of 7 for a frame detection algorithm), and/or (b) the number of sequential timeslots and windows in which a valid tag was detected is changed (e.g., from 7 to 3 for a sequential detection algorithm).

In some scenarios, the number of valid marker detections of criteria (a) is decreased in accordance with the measured speed. For example, the number of valid marker detections of criteria (a) is decreased by a first value (e.g., 2) when the measured speed falls within a first range of speeds and decreased by a second value (e.g., 4) when the measured speed falls with a second range of speeds having higher values then the first range of speeds. The present invention is not limited to the particulars of this example.

Similarly, the number of sequential timeslots or windows of criteria (b) is decreased in accordance with measured speed. For example, the number of sequential timeslots or windows of criteria (b) is decreased by a first value (e.g., 2) when the measured speed falls within a first range of speeds and decreased by a second value (e.g., 4) when the measured speed falls with a second range of speeds having higher values then the first range of speeds. The present invention is not limited to the particulars of this example.

Upon completing step 514, step 516 is performed where the detection algorithm is performed using the changed criteria. The detection algorithm is performed to determine whether or not a valid AM marker is in the surveillance or detection zone. If a valid AM marker has been detected in the surveillance or detection zone [518:YES], then an alarm is issued as shown by step 520. In contrast, if a valid AM marker has not been detected in the surveillance or detection zone [518:NO], then the alarm is not issued. Thereafter, step 522 is performed where method 500 ends or other processing is performed (e.g., return to step 504).

As noted above, the present disclosure concerns system and methods in which a person's speed is determined as (s)he traverses a surveillance or detection zone. A detection algorithm is then varied based on the measured speed. The detection algorithm can be varied in such a way that the rigor of a detection algorithm applied to detect an AM marker is reduced purposely as the speed measured by the traffic counter increases. Reducing the rigor of the detection algorithm increases the likelihood that the system controller will generate an EAS alarm in response to the presence of an EAS tag in the detection zone, even under conditions when EAS tag is moving through the detection zone at a fast rate of travel. A further benefit is that by reducing the rigor associated the detection algorithm, the amount of time required to trigger a detection alarm can be reduced. Since it can be concluded that someone running out of retail store has a higher risk of being a shoplifter than a normal paced walker, it is not unreasonable to vary the detection algorithm in such a way that the detection time and rigor of the detection process are reduced.

A normal walking speed for a human is 4.59 Ft/sec. At 4.59 Ft/sec., someone passing through the EAS detection system is required to be in the detection range for 1.735 ft. (in a 60 Hz environment). Considering that the normal detection time can be as long as 378 mS and the field associated with the detection zone extends about 3.25 Ft on average, there is a threshold at which point a fast walking person carrying an AM marker will not be detected. This threshold appears to correspond to a rate of travel at about 8.5 Ft/sec. Using the novel process described herein, if the speed is determined to be faster than the threshold, then the detection criteria will be adjusted to allow marker detection despite the reduced time in range to the pedestals.

Figure 6:
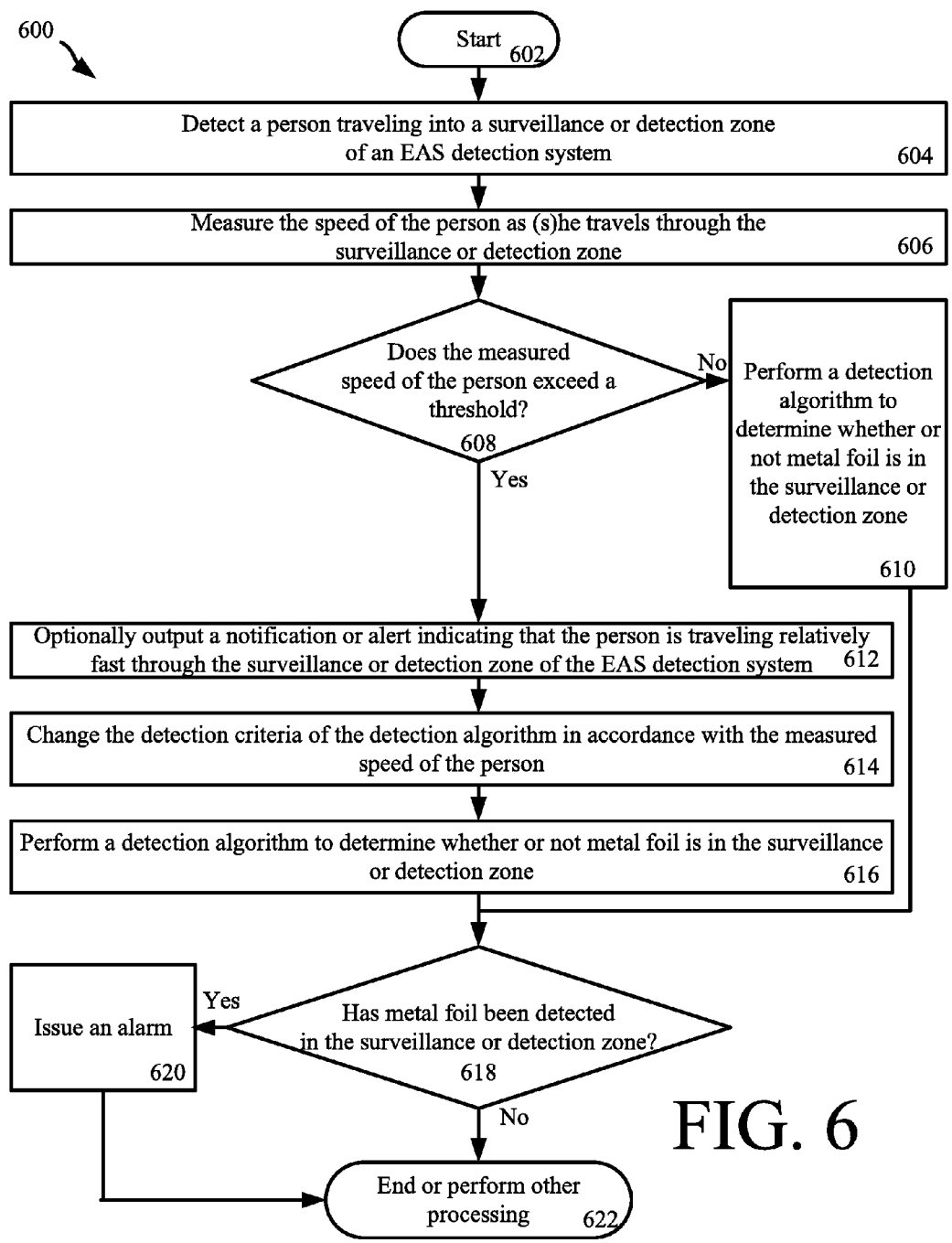
FIG. 6 is a flowchart that is useful for understanding an exemplary method for issuing an alarm responsive to the presence of a metal foil in an EAS detection system.

Referring now to FIG. 6, there is provided a flowchart illustrating an exemplary method 600 for issuing a metal foil alarm in an EAS detection system (e.g., EAS detection system 100 of FIG. 1). Method 600 begins with step 602 and continues with step 604 where a detection is made that a person is traveling into a surveillance or detection zone (e.g., surveillance or detection zone 202 of FIG. 2) of an EAS detection system (e.g., EAS detection system 100 of FIG. 1). Next in step 606, the speed of the person is measured as (s)he travels through the surveillance or detection zone. If the measured speed of the person does not exceed a threshold [608:NO], then step 610 is performed where a detection algorithm is executed to determine whether or not a metal foil is in the surveillance or detection zone. If the presence of metal foil is detected in the surveillance or detection zone [618:YES], then an alarm is issued as shown by step 620. In contrast, if metal foil has not been detected in the surveillance or detection zone [618:NO], then the alarm is not issued. Thereafter, step 622 is performed where method 600 ends or other processing is performed (e.g., return to step 604).

If the measured speed of the person exceeds the threshold [608:YES], then optional step 612 is performed. In optional step 612, a notification or alert is output indicating that the person is traveling relatively fast through the surveillance or detection zone of the EAS detection system. In next step 614, detection criteria of the metal foil detection algorithm is changed in accordance with the measured speed of the person. The detection criteria can include, but is not limited to, (a) the number of metal foil detections out of N attempts to detect the metal foil (e.g., 7 out of 7 is changed to 3 output of 7 for a frame detection algorithm), and/or (b) the number of sequential timeslots and windows in which a metal foil was detected is changed (e.g., from 7 to 3 for a sequential detection algorithm).

In some scenarios, the number of valid metal foil detections of criteria (a) is decreased in accordance with the measured speed. For example, the number of metal foil detections of criteria (a) is decreased by a first value (e.g., 2) when the measured speed falls within a first range of speeds and decreased by a second value (e.g., 4) when the measured speed falls with a second range of speeds having higher values then the first range of speeds. The present invention is not limited to the particulars of this example.

Similarly, the number of sequential timeslots or windows of criteria (b) is decreased in accordance with measured speed. For example, the number of sequential timeslots or windows of criteria (b) is decreased by a first value (e.g., 2) when the measured speed falls within a first range of speeds and decreased by a second value (e.g., 4) when the measured speed falls with a second range of speeds having higher values then the first range of speeds. The present invention is not limited to the particulars of this example.

Upon completing step 614, step 616 is performed where the metal foil detection algorithm is performed using the changed criteria. The detection algorithm is performed to determine whether or not metal foil is present in the surveillance or detection zone. If a metal foil has been detected in the surveillance or detection zone [618:YES], then an alarm is issued as shown by step 620. In contrast, if the presence of metal foil has not been detected in the surveillance or detection zone [618:NO], then the alarm is not issued. Thereafter, step 622 is performed where method 600 ends or other processing is performed (e.g., return to step 604).

Figure 7:
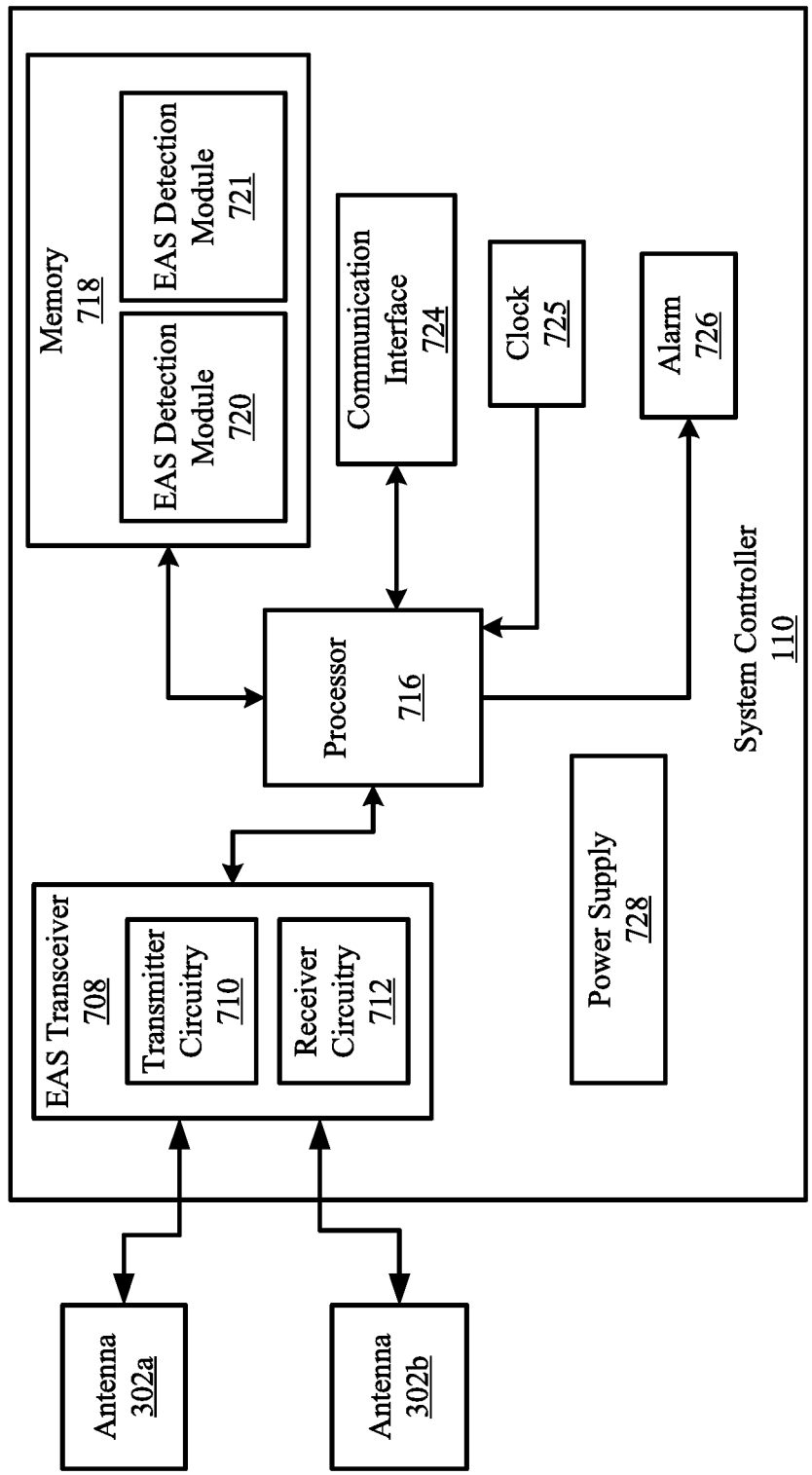
FIG. 7 is a block diagram of an exemplary architecture for a EAS system controller.

Referring now to FIG. 7, there is provided a block diagram that is useful for understanding the arrangement of the system controller 110. The system controller comprises a processor 716 (such as a micro-controller or Central Processing Unit ("CPU")). The system controller also includes a computer readable storage medium, such as memory 718 on which is stored one or more sets of instructions (e.g., software code) configured to implement one or more of the methodologies, procedures or functions described herein. The instructions (i.e., computer software) can include an EAS detection module 720 to facilitate EAS tag detection and perform backfield reduction for reducing undesired alarms as described herein. These instructions can also include a metal foil detection module 721 to facilitate metal foil detection. The instructions described herein can also reside, completely or at least partially, within the processor 716 during execution thereof.

The system also includes at least one EAS transceiver 708, including transmitter circuitry 710 and receiver circuitry 712. The transmitter and receiver circuitry are electrically coupled to antenna 302a and the antenna 302b. A suitable multiplexing arrangement for EAS tag detection can be provided to facilitate both receive and transmit operations using a single antenna (e.g., antenna 302a or 302b). Transmit operations for tag detection can occur concurrently at antennas 302a, 302b after which receive operations can occur concurrently at each antenna to listen for marker tags which have been excited. Alternatively, transmit operations can be selectively controlled as described herein so that only one antenna is active at a time for transmitting marker tag exciter signals for purposes of executing the various algorithms described herein. Such an arrangement involving a single antenna transmitting exciter signals is more suitable for metal foil detection operations as described herein. The antennas 302a, 302b can include an upper and lower antenna similar to those shown in FIG. 1. Input exciter signals applied to the upper and lower antennas can be controlled by transmitter circuitry 710 or processor 716 so that the upper and lower antennas operate in a phase aiding or a phase opposed configuration as required.

Additional components of the system controller 110 can include a communication interface 724 configured to facilitate wired and/or wireless communications from the system controller 110 to a remotely located EAS system server. The communication interface can be used to facilitate communications with the traffic counter control unit 113 for receiving traffic and speed information. The system controller can also include a real-time clock, which is used for timing purposes, an alarm 726 (e.g., an audible alarm, a visual alarm, or both) which can be activated when an active marker tag (or metal foil) is detected within the surveillance or detection zone 202. A power supply 728 provides necessary electrical power to the various components of the system controller 110. The electrical connections from the power supply to the various system components are omitted in FIG. 7 so as to avoid obscuring the invention.

Those skilled in the art will appreciate that the system controller architecture illustrated in FIG. 7 represents one possible example of a system architecture that can be used with the present invention. However, the invention is not limited in this regard and any other suitable architecture can be used in each case without limitation. Dedicated hardware implementations including, but not limited to, application-specific integrated circuits, programmable logic arrays, and other hardware devices can likewise be constructed to implement the methods described herein. It will be appreciated that the apparatus and systems of various inventive embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A method for issuing an alarm in an Electronic Article Surveillance ("EAS") system, comprising:
    using an exciter coil to generate an electromagnetic field within a surveillance zone through which one or more persons travel when exiting from a secured area;
    detecting a response to the electromagnetic field caused by one or more objects within the surveillance zone;
    based on the response to the electromagnetic field, selectively producing an alarm condition in accordance with at least one detection algorithm for determining if there is a valid marker in the surveillance zone;
    measuring a speed of a person traveling through the surveillance zone;
    determining if the speed exceeds a threshold; and
    selectively varying at least one characteristic of the at least one detection algorithm when the speed exceeds a predetermined threshold.

2. The method according to claim 1, wherein the at least one detection algorithm is selected to detect a presence of an EAS marker tag within the surveillance zone.

3. The method according to claim 1, wherein the at least one detection algorithm is selected to detect a presence of a metal foil within the surveillance zone.

4. The method according to claim 1, wherein the at least one characteristic is varied to decrease a rigor of the at least one detection algorithm when the speed exceeds the threshold.

5. The method according to claim 4, wherein the extent to which the characteristic is varied to decrease said rigor is selectively varied in accordance with a plurality of different predefined speed ranges.

6. The method according to claim 1, wherein the at least one characteristic is varied to increase a likelihood of producing an alarm condition responsive to application of the at least one detection algorithm.

7. The method according to claim 1, wherein the characteristic that is varied comprises a number of valid detections out of N attempted detections during a predetermined time period which are required by the detection algorithm before an alarm is triggered.

8. The method according to claim 7, wherein the detection algorithm is a frame detection algorithm.

9. The method according to claim 1, wherein the characteristic that is varied comprises a number of sequential timeslots in which a valid detection is required by the detection algorithm before an alarm is triggered.

10. The method according to claim 9, wherein the detection algorithm is a sequential detection algorithm.

11. An Electronic Article Surveillance ("EAS") system, comprising:
    an EAS transmitter coupled to an exciter antenna and arranged to generate an electromagnetic field within a surveillance zone through which one or more persons travel when exiting from a secured area;
    a receiving antenna arranged to detect a response to the electromagnetic field caused by one or more objects within the surveillance zone;
    a system controller, communicatively coupled to the receiving antenna, which evaluates the response to the electromagnetic field, and selectively produces an alarm signal in accordance with at least one detection algorithm which facilitates detection of a valid marker in the surveillance zone;
    a speed detector, communicatively coupled to the system controller, which measures a speed of a person traveling through the surveillance zone;
    wherein the system controller is configured to selectively vary at least one characteristic of the at least one detection algorithm when the speed indicated by the speed detector exceeds a predetermined threshold.

12. The EAS system according to claim 11, wherein the at least one detection algorithm is configured to detect a presence of an EAS marker tag within the surveillance zone.

13. The EAS system according to claim 11, wherein the at least one detection algorithm is configured to detect a presence of a metal foil within the surveillance zone.

14. The EAS system according to claim 11, wherein the system controller is configured to vary the at least one characteristic to selectively decrease a rigor of the at least one detection algorithm when the speed exceeds the threshold.

15. The EAS system according to claim 14, wherein the extent to which the characteristic is varied to decrease said rigor is selectively modified in accordance with a plurality of different predefined speed ranges.

16. The EAS system according to claim 11, wherein the at least one characteristic is varied to increase a likelihood of producing an alarm condition responsive to execution of the at least one detection algorithm.

17. The EAS system according to claim 11, wherein the characteristic that is varied comprises a number of valid detections out of N attempted detections during a predetermined time period which are required by the detection algorithm before an alarm is triggered.

18. The EAS system according to claim 17, wherein the detection algorithm is a frame detection algorithm.

19. The EAS system according to claim 11, wherein the characteristic that is varied comprises a number of sequential timeslots in which a valid detection is required by the detection algorithm before an alarm is triggered.

20. The EAS system according to claim 19, wherein the detection algorithm is a sequential detection algorithm.

21. The EAS system according to claim 11, wherein the speed detector is a traffic counter which is configured to count people passing through the surveillance zone.

\* \* \* \* \*